(12) United States Patent
Gu et al.

(10) Patent No.: US 9,371,185 B2
(45) Date of Patent: Jun. 21, 2016

(54) METHOD FOR DISTRIBUTED STORAGE AND USE OF UNDERGROUND WATER IN MINE

(71) Applicants: CHINA SHENHUA ENERGY COMPANY LIMITED, Beijing (CN); CHINA UNIVERSITY OF MINING & TECHNOLOGY, Beijing (CN)

(72) Inventors: Dazhao Gu, Beijing (CN); Kai Zhang, Beijing (CN); Shushe Chen, Yulin (CN); Wenyu Wei, Yulin (CN); Feng Yang, Beijing (CN)

(73) Assignees: CHINA SHENHUA ENERGY COMPANY LIMITED, Beijing (CN); CHINA UNIVERSITY OF MINING & TECHNOLOGY, BEIJING, Beijing (CN)

( * ) Notice: Subject to any disclaimer, the term of this patent is extended or adjusted under 35 U.S.C. 154(b) by 0 days.

(21) Appl. No.: 14/397,506

(22) PCT Filed: Apr. 27, 2013

(86) PCT No.: PCT/CN2013/074902
§ 371 (c)(1),
(2) Date: Oct. 28, 2014

(87) PCT Pub. No.: WO2013/159749
PCT Pub. Date: Oct. 31, 2013

(65) Prior Publication Data
US 2015/0125209 A1 May 7, 2015

(30) Foreign Application Priority Data

| Apr. 28, 2012 | (CN) | 2012 1 0133605 |
| Apr. 28, 2012 | (CN) | 2012 1 0133830 |
| Apr. 28, 2012 | (CN) | 2012 1 0134162 |
| Jul. 23, 2012 | (CN) | 2012 1 0256970 |

(51) Int. Cl.
*B65G 5/00* (2006.01)
*E21C 41/16* (2006.01)
(Continued)

(52) U.S. Cl.
CPC . *B65G 5/00* (2013.01); *E21C 41/16* (2013.01); *E21F 16/00* (2013.01); *E21F 17/16* (2013.01)

(58) Field of Classification Search
USPC .................................................. 405/52–55
See application file for complete search history.

(56) References Cited

U.S. PATENT DOCUMENTS 4,323,281 A * 4/1982 Greenwald et al. ............. 299/19
4,468,154 A * 8/1984 Janssen et al. ............. 405/129.1
(Continued)

FOREIGN PATENT DOCUMENTS

| CN | 1042966 A | 6/1990 |
| CN | 102809765 A | 5/2012 |
| CN | 102862775 A | 1/2013 |
| CN | 102865103 A | 1/2013 |

OTHER PUBLICATIONS http://www.oxforddictionaries.com/us/definition/american_english/space.*

(Continued)

*Primary Examiner* — Sean Andrish
(74) *Attorney, Agent, or Firm* — Armstrong Teasdale LLP

(57) ABSTRACT

Disclosed is a method for distributed storage and use of mine groundwater. The method comprises the following steps: A. prospecting an area of an underground space to be mined, and acquiring data on the bedrock geology of the strata; B. observing the mine groundwater, and acquiring the conditions of the flow distribution, water quality data and water pressure data for the mine groundwater; C. designating one or more goaf spaces through which mine groundwater cannot permeate as a water storage space of a distributed underground reservoir according to the data on the bedrock geology of the strata acquired in step A and the conditions of the flow distribution, water quality data and water pressure data for the mine groundwater acquired in step B; and D. after the designated water storage space is formed, mine groundwater generated when mining a mining face adjacent thereto naturally seeps into the water storage space. The method can reduce mine groundwater run-off and the effect on the growth and recovery of the ecological environment.

13 Claims, 3 Drawing Sheets

(51) Int. Cl.
*E21F 16/00* (2006.01)
*E21F 17/16* (2006.01)

(56) References Cited

U.S. PATENT DOCUMENTS 4,986,696 A * 1/1991 Pera et al. .................. 405/36
6,840,710 B2 * 1/2005 Peters et al. ................ 405/57

OTHER PUBLICATIONS

Shuangming Wang et al., Coal Exploitation and Ecological Water Level Protection in Ecologically Fragile Areas, 2010 National Mining Technology Forum Proceedings Aug. 2010, vol. 19, pp. 212-216.
International Search Report and Written Opinion for PCT/CN2013/074902, mailed Aug. 1, 2013.

* cited by examiner

METHOD FOR DISTRIBUTED STORAGE AND USE OF UNDERGROUND WATER IN MINE

This application claims priority to International Publication Number WO 2013/159749, filed on Apr. 27, 2013, which claims priority to CN Patent Application No. 201210134162.5, filed on Apr. 28, 2012; CN Patent Application No. 201210133605.9, filed on Apr. 28, 2012; CN Patent Application No. 201210133830.2, filed on Apr. 28, 2012; and CN Patent Application No. 201210256970.9, filed on Jul. 23, 2012, the disclosures of which are hereby expressly incorporated by reference in their entireties.

TECHNICAL FIELD

The present invention relates to a field of underground water resource usage, and specifically to a method for distributed storage and use of mine groundwater.

BACKGROUND OF THE INVENTION

Water resource shortage has become a serious threat to the national economic development and the people's living quality improvement. During coal mining, mine groundwater will be inevitably produced in a mine. In some mines, the annually discharged mine groundwater is as high as 2.2 billion tons, and 2 tons of waste water will be discharged once one ton of coal is mined on average. Thus, a great amount of valuable water resource is wasted. Furthermore, once the mine groundwater is discharged out, it will cause serious environment pollution to the surrounding environment.

For example, in the western areas of China, the coal resource is abundant while the water resource is deficient. The water shortage situation in mining areas and in surrounding regions is getting further worse, thus seriously restricting normal production of mining areas and being harmful to harmonious resource-environment development.

Currently, in the processing to mine groundwater, the mine groundwater is mainly pumped to the ground surface. Due to factors such as seasonality for water resource usage, the water resource is seriously wasted, thus causing unbalance for local water resource supply. Also, the processing of the mine groundwater suspended matter as well as water quality is performed mainly by discharging the mine water from underground to the ground surface, which tends to cause secondary pollution.

For protection to mine groundwater resource, several attempts have been made in China. For example, Wutongzhuang Mine of Fengfeng Corporation, in order to prevent and manage the harm to deep water and protect the mine groundwater, collected and processed the mine groundwater, and backfilled it to the Ordovician limestone aquifer. In addition, in some patent literatures such as "Mine water processing and mine water integrated processing device" (CN1884145), "Mine water processing technology by means of mine underground tunnel spaces" (CN101012091), "Coal mine groundwater purification processing device and method" (CN102336484A), "Mine water comprehensive processing and using technology" (CN101975087A), "Purification method for coal mine mined-out area mine groundwater" (CN1482078), solutions of filtering and purifying water by mined-out areas, processing mine water by a purification device using tunnel spaces, collecting and using mine water to process and protect mine water were proposed, respectively.

In the above methods, the mine water is used mainly by first collecting mine water to a water sump by an underground pump and piping and then transporting the water via discharging pipes to the ground surface for use. Two ways were provided: 1) collecting and then processing the mine groundwater in a mine, and then directly re-using the water in production underground in the mine; and 2) collecting the water and then transporting the same to the ground surface for processing and use. Both of these two ways, either processing underground after collecting, or processing on the ground surface, will pump mine water from the stratum spaces. In fact, this will cause mine groundwater run-off, resulting in continuous drop in water level and leading to the negative effect on the growth and recovery of the ecological environment.

SUMMARY OF THE INVENTION

In view of the above, the main objective of the present invention is to provide a method for distributed storage and usage of mine groundwater, to reduce mine groundwater loss and influence to growing and recovering in the ecological environment.

In order to achieve the above objective, the present invention provides a method for distributed storage and use of mine groundwater in a mine, characterized in that the method comprises the following steps:

A. prospecting an area of an underground space to be mined, and acquiring basic geological data of the strata;

B. observing the mine groundwater, and acquiring the conditions of the flow distribution, water quality data and water pressure data for the mine groundwater;

C. designating one or more goaf spaces through which mine groundwater cannot permeate as a water storage space of a distributed underground reservoir according to the data on the bedrock geology of the strata acquired in step A and the conditions of the flow distribution, water quality data and water pressure data for the mine groundwater acquired in step B;

D. after the designated water storage space is formed, mine groundwater generated when mining a mining face adjacent thereto naturally seeps into the water storage space.

Preferably, the method provided in the present invention further comprises: E. on each of the water storage spaces, providing a water pumping hole communicated to the ground surface, by which the mine groundwater is pumped to the ground surface for usage when water for use is needed; and the external water is pumped back to the water storage spaces when more water is needed to be stored.

Preferably, step A comprises: prospecting before coal mining and prospecting after the mined-out area is formed, and acquiring the basic geological data before stratum mining and the basic geological data of the goaf, respectively; and in step C, according to the obtained basic geological data before stratum mining and of the goaf and the fluid flow field, water quality data and water pressure data for the mine groundwater acquired in step B, designating the water storage spaces.

Preferably, the basic geological data at least comprise: the strata texture, the lithology of each stratum, the rock mechanical strength, the rock permeability, and the space range of the goaf.

Preferably, the acquiring fluid flow field in step B is: designating a flowing direction of the mine groundwater.

Preferably, the method further comprises: on first mining, under the premise of safety, first mining on a mining face with a minimum elevation among mining faces in the area to be mined.

Preferably, the method further comprises: during coal mining, backfilling the bottom of the goaf as the storing space with coal gangues, to form a gangue purifying filtering layer; wherein the filling amount and the filling granularity of the gangue purifying filtering layer depend on the filling amount and the filling granularity of the sand filter of the waterworks.

Preferably, the method further comprises: providing the corresponding mining face before the water storage space is formed as a preset region which retains coal gangues with a preset thickness, to form the gangue purifying filtering layer on the bottom of the water storage space; wherein the water pumping hole of the water storage space is communicated from the bottom of the gangue purifying filtering layer to the ground surface.

Preferably, the method comprises: during coal mining, selecting a region with a minimum gangue strength as the preset region, and determining the necessarily retained coal gangue layer thickness according to the filling amount of the sand filter of the waterworks; and after coal mining, the coal gangues slumping naturally to form a gangue layer of granules with different sizes which serves as the gangue purifying filtering layer.

Preferably, in the way to naturally form the gangue purifying filtering layer after coal mining, the method comprises: during coal mining, backfilling the gangue granules with a breaking degree of 200~400 mm to the preset region, to form the gangue purifying filtering layer with better filtering performance.

Preferably, the water pumping hole is connected, at its end on the ground surface, with a control valve by which the mine groundwater is pumped to the ground surface or the external water is pumped back to the water storage spaces.

Preferably, the method further comprises: with a concrete waterproof layer, sealing and reinforcing drift outlets of the horizontal tunnels of the goafs, which serve as the water storage spaces, intersecting main tunnels.

Preferably, the method further comprises: at the drift outlets of the goafs, which serve as the water storage spaces, additionally providing a goaf water level observing transparent hose and a water relief pipe; and when the water level of the goaf is over a warning level, opening a water relief valve for drainage.

With the method for distributed storage of mine groundwater of the present invention, the mine groundwater is stored in the water impenetrable mined-out area, thus reasonably storing the mine groundwater and reducing influence to growing and recovering in the ecological environment.

Moreover, with the method for distributed usage of mine groundwater of the present invention, the mine groundwater is stored in the water impenetrable mined-out area. When needed for usage, the mine groundwater is pumped out, by the water pumping hole, to the ground surface. When needed for storage, the external water is pumped, by the water pumping hole, back to the storing spaces, thus reducing mine groundwater loss and influence to growing and recovering in the ecological environment.

DESCRIPTION OF EXEMPLARY EMBODIMENTS

The present invention will be explained in detail by specific embodiments with reference to the figures.

The present invention provides a method for distributed storage of mine groundwater wherein the mine groundwater is stored in goaf spaces through which mine groundwater cannot permeate, rather than pumped out of the ground, thus reasonably storing the mine groundwater and reducing the effect on the growth and recovery of the ecological environment.

The present invention further provides a method for distributed use of mine groundwater wherein the mine groundwater is stored in goaf spaces through which mine groundwater cannot permeate. When needed for use, the mine groundwater is pumped out, by the water pumping hole, to the ground surface. When needed for storage, the external water is pumped, through the water pumping hole, back to the storing spaces, thus reducing mine groundwater run-off and the effect on the growth and recovery of the ecological environment.

Figure 1:
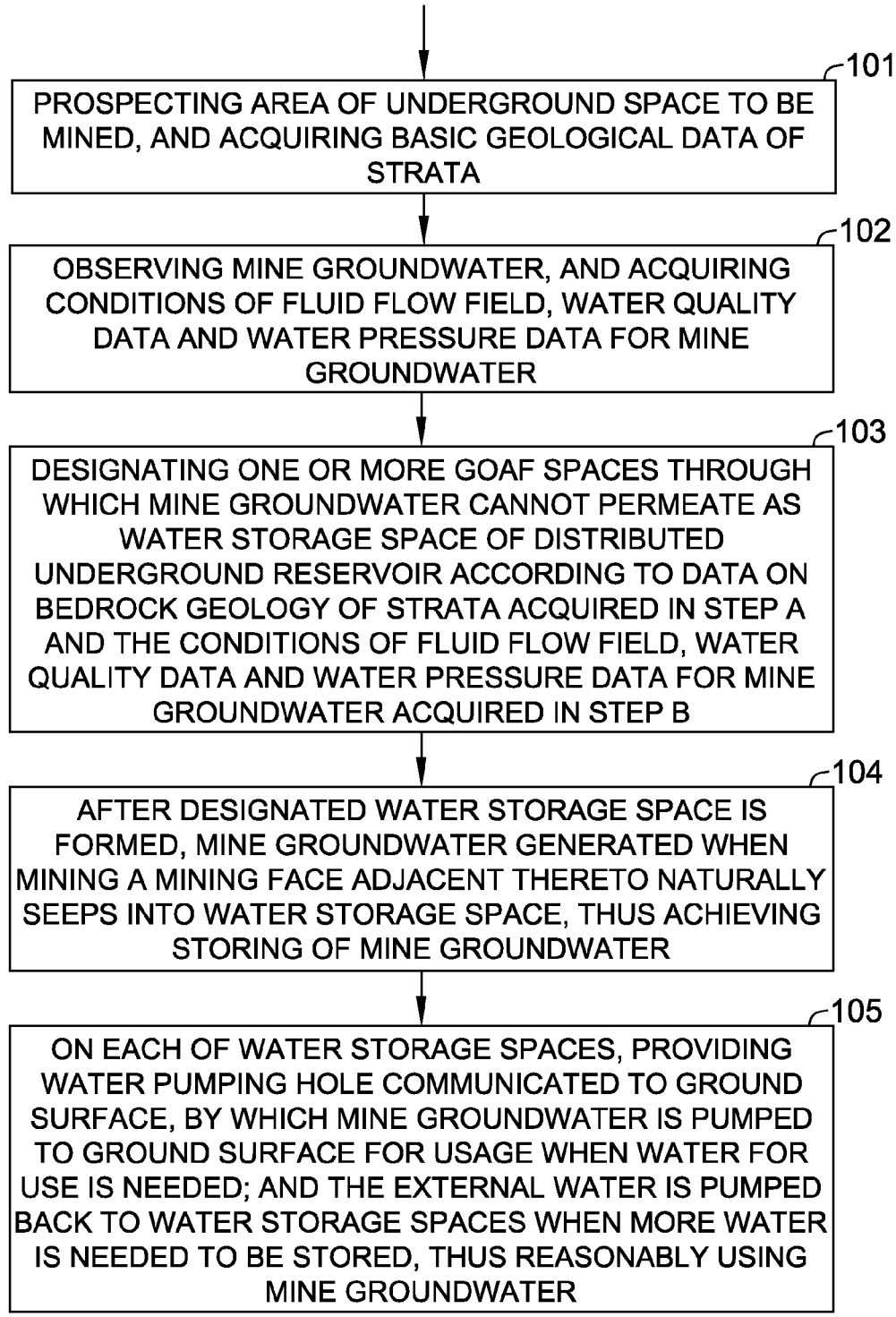
FIG. 1 is a flow diagram for a method for distributed use of mine groundwater in a mine according to the present invention.

As shown in FIG. 1, a method for distributed storage and use of mine groundwater in a mine according to the present invention comprises the following steps:

Step 101: prospecting an area of an underground space to be mined, and acquiring basic geological data of the strata.

In practical use, "prospecting an area of an underground space to be mined" comprises: prospecting before coal mining and prospecting after the goaf spaces are formed, and acquiring the basic geological data before stratum mining and the basic geological data of the goaf spaces, respectively. These basic geological data comprise: the strata texture, the lithology of each stratum, the rock mechanical strength, the rock permeability, the space range of the goaf spaces, etc.

Step 102: observing the mine groundwater, and acquiring the conditions of the fluid flow field, water quality data and water pressure data for the mine groundwater.

Said "acquiring the conditions of the flow distribution for the mine groundwater" is: determining a flowing direction of the underground water.

Step 103: designating one or more goaf spaces through which mine groundwater cannot permeate as a water storage space of a distributed underground reservoir according to the data on the bedrock geology of the strata acquired in step 101 and the conditions of the flow distribution, water quality data and water pressure data for the mine groundwater acquired in step 102.

In practical use, the water storage space may be designated according to the acquired basic geological data before stratum mining and basic geological data of the goaf spaces and the conditions of the flow distribution, water quality data and water pressure data for the mine groundwater acquired in Step 102.

Step 104: after the designated water storage space is formed, mine groundwater generated when mining a mining face adjacent thereto naturally seeps into the water storage space, thus achieving storing of mine groundwater.

Step 105: on each of the water storage spaces, providing a water pumping hole communicated to the ground surface, by which the mine groundwater is pumped to the ground surface for usage when water for use is needed; and the external water is pumped back to the water storage spaces when more water is needed to be stored, thus reasonably using the mine groundwater.

In addition, regarding the selection for initial storing spaces, the present invention is different from the prior solution in which the coal seam with a relatively high elevation is selected for first mining based on water prevention and management theory. The present invention performs first mining on a mining face with a minimum elevation among mining faces in the region to be mined, thus facilitating mine groundwater to naturally permeate into the storing spaces of the distributed reservoir.

Also, as the storing spaces of the distributed reservoir are limited, a large amount of accumulated water will cause increase of water pressure. In order to prevent a water gushing accident, it is possible to take some actions for sealing and reinforcing engineering in the present invention.

In practical use, the corresponding mining face before the water storage space is formed may be provided as a preset region which retains coal gangues with a preset thickness; after coal mining, the layers of coal gangues slump to naturally form the gangue purifying filtering layer on the bottom of the water storage space. Therefore, the water pumping hole of the water storage space communicated to the ground surface is communicated from the bottom of the gangue purifying filtering layer to the ground surface.

Hereinafter, the present invention will be further described by means of an embodiment of mine groundwater storage by the distributed reservoir in Shen Dong mining area as an example.

First, in order to select possible appropriate mine groundwater storage spaces, it is necessary to prospect an area of an underground space to be mined. In the present embodiment, based on a comprehensive prospecting result figure of an underground space in an area to be mined, the data and information for the strata, the lithology, the structure and distribution are acquired, and the water level data as well as related data and information are introduced from the mine groundwater distribution dynamic observation database. The current drilling hole data, hydro-geological map as well as related hydro-geological materials are collected sufficiently, and the original data are digitalized by digitalizing devices or scanners for example. By database tool management, maintenance and processing, the basic geological data of the strata, such as the strata texture, the lithology of each stratum, the rock mechanical strength, the rock permeability, and the space range of the mined-out area, are finally obtained.

In the present invention, by a method based on geophysical prospecting technology, dynamic prospecting can be made to the hydro-geological condition of the area to be mined. The method based on geophysical prospecting technology includes a seismic method, an electrical method, a geo-radar method, as well as an efficient combination thereof. Therefore, the important information with a higher precision, such as the coal rock structure, the aquifer structure as well as distribution thereof, the shallow unconsolidated layer structure, and the water abundance, can be acquired. The acquired parameters include: the aquifer thickness, the permeability coefficient, the specific inflow, the lithological association, the aquifer pressure, the protection layer structure, etc.

Next step is to observe the mine groundwater, and acquire the conditions of the flow distribution, water quality data and water pressure data for the mine groundwater. In the present embodiment, in order to explore the mine groundwater flow field distribution character, flowing regularity, etc, dynamic observing to the water level, water quality and water pressure of the mine groundwater in the region to be mined will be made periodically.

The mine groundwater distribution dynamic observing and collection can be made by two alternative ways: a manual way and an automatic way. In consideration of the actual hydro-geological condition, data are generally recorded once a week and are introduced into the database by a digital device. By the database, data coming from multiple sources, from different times and in different formats, are collected and serve as original hydro-geological bases.

The mine groundwater observing is made mainly for three purposes: 1) by the water level data, acquiring fluid flow field of the mine groundwater, i.e. the flowing direction of the mine groundwater, based on which the foundation can be provided for selecting the underground reservoir because the reservoir should be selected to allow the mine groundwater to flow therein; 2) acquiring the water quality data, to understand pollution condition for the mine groundwater in the underground reservoir and thus provide foundation for mine groundwater processing and using; and 3) acquiring the water pressure data, to provide foundation for sealing and protection such that the underground reservoir has a sufficient structural strength to meet the water pressure requirement, thus avoiding leakage.

Next, according to the basic stratum geological data and the fluid flow field, water quality data and water pressure data of the mine groundwater acquired in previous steps, designating one or more goaf spaces through which mine groundwater cannot permeate as a storage space of a distributed underground reservoir. The water storage spaces of the distributed underground reservoir can be determined by the following steps:

Collecting a rock strength and a coal seam depth of the underground spaces in the area to be mined.

"Collecting the rock strength" is measuring the compressive strength of the rock. Taking a certain specific mining area as an example, when an area with a certain volume is selected, according to the drilling hole number for mining area exploring, a certain number of measuring points are determined and the number of the measuring points equals to that of the drilling holes. For the above measuring points, a rock sample is taken and the rock compressive strength thereof is measured. If the measuring points having a compressive strength higher than a preset strength value, such as 3 MPa for example, meet a certain percentage, such as 80% for example, this area is regarded as having a rock strength higher than the preset strength value, and this area can be selected as the horizontal covering region of the underground reservoir.

In the above embodiment, in addition to considering the parameter of rock strength, the influence of rock crack number to reservoir water retention may be further considered. Preferably, after determining the horizontal covering region of the underground reservoir, the method further comprises: collecting the number of rock cracks; selecting areas with the number of rock cracks less than a preset crack number; and projecting an overlapped area of the selected area with the above-described horizontal covering area onto the horizontal plane as the horizontal covering region of the underground reservoir.

In this preferable embodiment, similar to the rock strength, when acquiring the number of rock cracks and selecting the area, an area with a certain volume may be selected, and the number of the rock cracks in this area will be measured. If the measuring points having a measured result less than a preset crack number meet a certain number or percentage, this area is regarded as having a rock crack number less than the preset crack number, and this area can be intersected with the above-described horizontal covering region obtained by the parameter of rock strength, thus finally determining the horizontal covering area of the underground reservoir.

In the above embodiment, both the rock compressive strength and the rock crack number are considered, and the area with a large rock compressive strength and a small rock crack number is selected as the horizontal covering region of the underground reservoir.

After the horizontal covering area of the underground reservoir is determined, the depth of the underground reservoir is to be determined. The lowest position for coal seam depth is set as the bottom position of the underground reservoir. By underground exploring, the position of the coal seam is detected and the lowest position for coal seam depth is set as the bottom position of the underground reservoir.

In an embodiment, if the average coal seam depth of a mining area is 180 meters under the ground, the bottom position of the underground reservoir will be set as being 180 meters under the ground to facilitate subsequent mining work. As the coal seam is not strictly horizontal and is generally inclined, the depth of the coal seam relative to the horizontal plane is between 170 meters to 200 meters. Here, the bottom position of the underground reservoir is determined to be 200 meters under the ground.

The selection of the water storage spaces in the distributed reservoir is controlled by the medium condition of the underground spaces and the mine groundwater distribution. Therefore, according to the previously acquired data, the water storage spaces in the distributed reservoir can be divided into three types: (I) having good water storing ability, (II) having ordinary water storing ability, and (III) having poor water storing ability.

(I) the rock has a high mechanical strength, a high water pressure resistance, a good water-isolating capacity, a good water retention, and a good water storing ability;

(II) the rock has a middle mechanical strength, a middle water pressure resistance, a middle water-isolating capacity, an ordinary water retention, and an ordinary water storing ability;

(III) the rock has a poor mechanical strength, a poor water pressure resistance, a poor water-isolating capacity, a poor water retention, and a poor water storing ability. The detailed description for the three types of storing spaces is shown in Table 1:

effective protection layer thickness larger than or equal to 0. In such geological area, the rock has a middle mechanical strength, a middle water pressure resistance and a middle water-isolating capacity. For coal mining in such area, it may influence the aquifer. Therefore, it is necessary to take respective actions, such as strengthening support and protection during mining for example.

Type III has a poor water retention ability, with its effective protection layer thickness less than 0. In such geological region, the rock has a poor mechanical strength, a poor water pressure resistance and a poor water-isolating capacity. Coal mining will significantly influence the loose aquifer.

In the above embodiments, according to the effective protection layer thickness and the aquifer pressure, the water retention risk coefficient can be calculated. The ratio of the aquifer pressure P to the effective protection layer thickness H is defined as the water retention risk coefficient Ts:

$$Ts = P/H$$

Wherein Ts is the water retention risk coefficient, MPa/m;

P is the aquifer pressure, MPa, which, if a actually measured value thereof is not available, may be estimated as 0.01 h wherein h is a loose aquifer thickness;

H is the effective protection layer thickness.

When calculating the water retention risk coefficient, the aquifer pressure P can be acquired during geological exploring. For example, the aquifer pressure can be detected by a method of drilling and providing pressure sensors, or the aquifer pressure P may be detected by other measuring means in the prior art.

In the hydro-geology, a stratum with a drilling specific inflow less than 0.001 L/s·m is generally regarded as the water-isolating stratum. The water pressure resistance of the water-isolating stratum is closely related to its lithology. For the coal sedimentary rock, the water-isolating stratum lithology mainly includes mudstone, siltstone and sandstone.

According to the cracking structure growing extent of the effective protection layer and the engineering scale, the effective protection layer structure is divided into four types: complete structure, block structure, cataclastic structure, and loose structure. It can be considered that the complete structure has a good water retention, the block structure has an ordinary water retention, and the cataclastic structure and the loose structure are poor in water retention.

TABLE 1

| | Effective protection layer medium condition | | | |
|---|---|---|---|---|
| Types for evaluation | Rock water-isolating capacity | Effective protection layer structure | Effective protection layer thickness H(m) | Water retention risk coefficient (MPa/m) |
| Type I | Mainly mudstone | Complete structure | ≥0 | <0.10 |
| Type II | Sand-mud interbed (or sandy mudstone) | Block structure | | ≥0.10 |
| Type III | Mainly sandstone | Cataclastic structure Loose structure | <0 | |

Type I has a good water retention ability, with its water retention risk coefficient less than 0.1 and effective protection layer thickness larger than or equal to 0. In such geological area, the rock has a high mechanical strength, a high water pressure resistance and a good water-isolating capacity. For coal mining in such area, it is generally not destructive to the aquifer.

Type II has an ordinary water retention ability, with its water retention risk coefficient larger than or equal to 0.1 and For storing spaces of (I) having good storing ability as described above, in practical production, it can be considered that no or less additional sealing measures may be taken; and for storing spaces of (II) having ordinary storing ability and (III) having poor storing ability as described above, more additional sealing measures should be taken according to actual situation.

Figure 2:
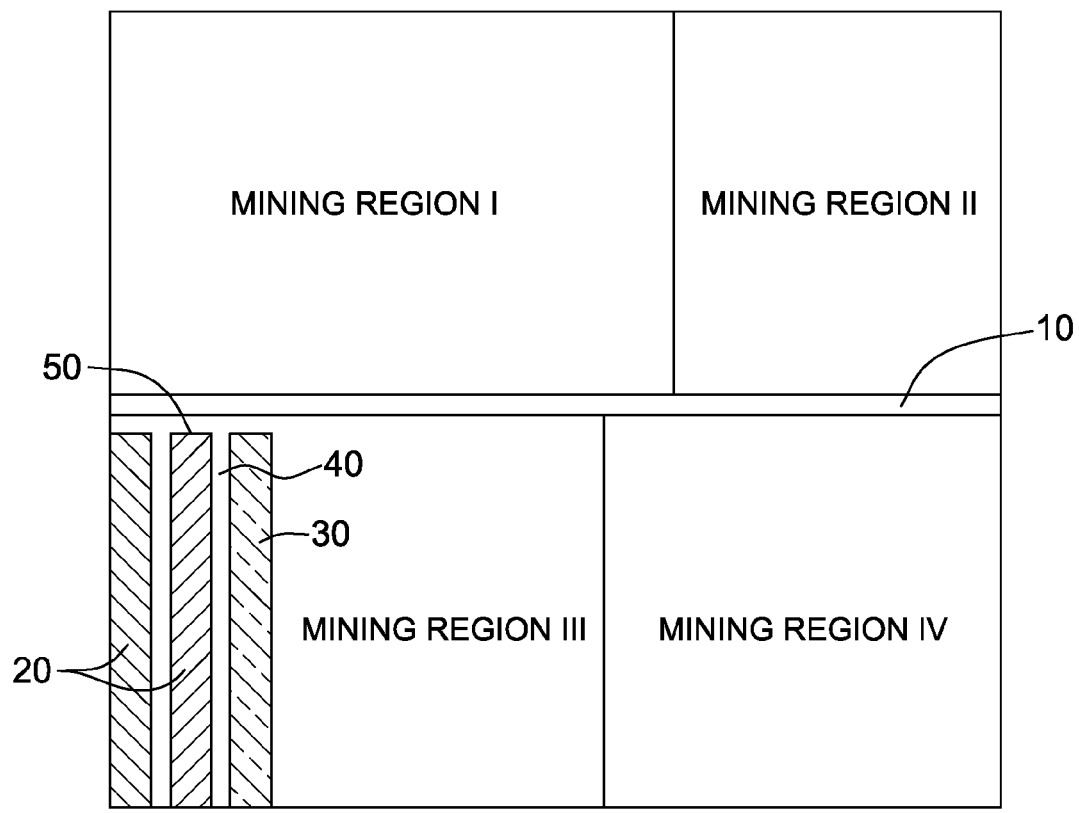
FIG. 2 is a spatial diagram of a preferred embodiment of the distributed reservoir according to the present invention.

Regarding the selection for initial storing spaces, the prior solution in which the coal seam with a relatively high elevation is selected for first mining based on water prevention and management theory is changed. First mining is performed on a mining face with a minimum elevation among mining faces in the area to be mined. For example, there are multiple mining faces in the area to be mined and the elevation is between 200 meters to 210 meters. In this case, first mining is performed on a mining face with an elevation of 200 meters, thus facilitating mine groundwater to naturally permeate into the distributed reservoir. The spatial arrangement of the distributed reservoir is shown in FIG. 2. FIG. 2 illustrates the spatial positions of the distributed reservoirs of three among four areas to be mined. In the figure, Mining Region I is adjacent to Mining Region II and Mining Region III is adjacent to Mining Region IV, and a tunnel 10 is provided between Mining Region I and Mining Region III and between Mining Region II and Mining Region IV. In Mining Region III, shown are two distributed reservoirs 20 and one mining face 30, and a coal column 40 is provided between the distributed reservoirs 20 and the mining face 30 for insulation. A water relief valve 50 is provided in a position close to the tunnel 10 between the two storing spaces.

Then, based on the determination of the distributed reservoir, by regulating the mining parameters, mainly the size of the mining face 30, the distributed reservoir 20 is controlled to be formed, to facilitate water storing.

In the present embodiment, by adequately increasing the length of the mining face 30, the storing spaces of the distributed reservoir 20 are enlarged, and the engineering work for preparation on the mining faces 30 can be reduced, thus improving the extraction rate. In consideration of the underground mining technological condition of the mining region and the actual coal seam storage stability of Shen Dong mining area, the length of the mining face 30 for first mining is determined to be 300 meters. In other mining area, it may be regulated according to actual situation. For example, the length of the mining face 30 for first mining may be set as 290-310 meters.

Also, by adequately increasing the advancing length of the mining face 30, the storing spaces of the distributed reservoir 20 can be further enlarged. In view of the fact that the mining coal seam storage is very stable, has a small inclination and possesses resource condition to arrange a long wall mining face 30 for long distance advancing, thus in design, in comprehensive consideration of various factors such as mine field structure and coal seam condition, the advancing length of the mining face 30 is lengthened as long as possible, and the advancing length of the mining face 30 for first mining is determined to be 4450 m. In other mining area, it may be regulated according to actual situation. For example, the advancing length of the mining face 30 for first mining may be set as 4400-4500 meters.

As the storing spaces of the distributed reservoir are limited, a large amount of accumulated water will cause increase of water pressure. In the present embodiment, in order to prevent a water gushing accident, it is necessary to take some sealing and protection engineering measures, to facilitate the mine groundwater to directly flow into the water storage spaces for filtering and storing and to reduce the mine groundwater flowing in the mine.

Specific measures include:

1. with a concrete waterproof layer, sealing and reinforcing drift outlets of the goafs, which serve as the water storage spaces, intersecting horizontal tunnels;

2. possibly, at all mined-out areas which serve as the storing spaces, or only at the drift outlets of the goafs low in terrain, additionally providing a goaf water level observing transparent hose and a water relief pipe; when the water level of the mined-out area is over a warning level, opening a water relief valve for draining superfluous water via piping to a mine groundwater sump, and further, pumping the superfluous water to the ground surface via a pipe connected with the mine groundwater sump.

In the present embodiment, in order to improve the quality of the mine groundwater, before pumping the mine groundwater from the water storage spaces in the distributed reservoir to the ground surface for usage, the stored water may be purified in advance. The purification may be performed by a method in the prior art, or can be achieved by the following method: at the bottom of the water pumping hole, arranging coal gangues with an adequate granularity as the purifying filtering layer for the mine groundwater.

Specifically, the gangue purifying filtering layer can be formed by two ways:

In the first way, it is formed by backfilling coal gangues during coal mining wherein those skilled in the art can backfill coal gangues depending on the filling amount and the filling granularity of the sand filter of the waterworks, thus forming the gangue purifying filtering layer.

In the second way, the gangue purifying filtering layer is formed naturally wherein during coal mining, a region with a minimum gangue strength is selected as the preset area, and the necessarily retained coal gangue layer thickness can be determined according to the filling amount of the sand filter of the waterworks.

After mining, the coal gangues will slump naturally, and due to its poor strength, will form a layer of granules with different sizes, i.e. the gangue purifying filtering layer.

In such a way, the coal gangues with a relatively small granularity can be backfilled during coal mining. For example, the gangue granules with a breaking degree of 200~400 mm may be backfilled to the preset region of the mining face, to form the gangue purifying filtering layer with better filtering performance.

Figure 3:
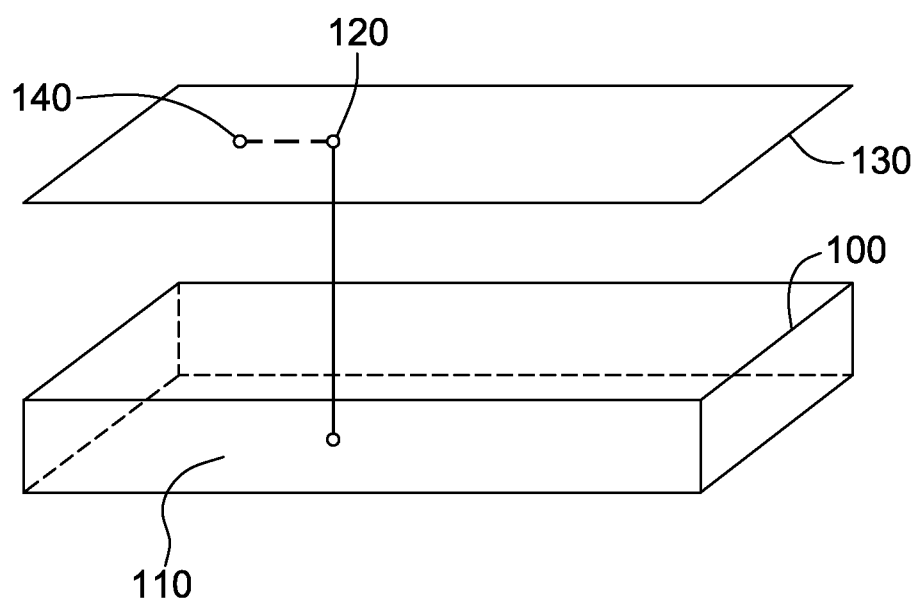
FIG. 3 is a diagram showing position and connection of the storing space with the purifying filtering layer, the water pumping hole and the control valve in the embodiment in FIG. 2.

As shown in FIG. 3, in the present embodiment, in a bottom middle position of a certain water storage space 100 on the distributed reservoir, a portion of the gangue purifying filtering layer 110 is formed by gangue slumping after coal mining. In FIG. 3, a water pumping hole 120 is communicated from the bottom of the gangue purifying filtering layer 110 in the water storage space 100 to the ground surface 130. The water pumping hole 120 is connected, at its end on the ground surface 130, with a control valve 140. In the present embodiment, by the control valve 140, the mine groundwater is pumped to the ground surface 130 or the external water is pumped back to the storing spaces 100.

As can be seen from the above embodiments, by the method for distributed usage of mine groundwater according to the present invention, the prior solution in which the mine groundwater is first pumped out and then is processed for usage is changed, the distributed storing of the mine groundwater is achieved by the underground spaces in the region to be mined, the underground water is purified, used and backfilled, and is stored in the stratum spaces as possible, for scientific uses, thus reducing mine groundwater loss and facilitating protection and recovery of the local ecological environment.

The invention claimed is:

1. A method for distributed storage and use of mine groundwater, characterized in that the method comprises the following steps:

A. prospecting an area to be mined, wherein the area to be mined comprises a strata, and acquiring basic geological data of the strata, wherein the basic geological data comprises bedrock geology;

B. mining the area to be mined to form one or more goaf spaces;

C. observing mine groundwater, and acquiring conditions of flow distribution, water quality data and water pressure data for the mine groundwater;

D. designating the one or more goaf spaces having water retention ability as one or more designated water storage spaces of a distributed underground reservoir according to the bedrock geology acquired in step A and the conditions of flow distribution, water quality data and water pressure data for the mine groundwater acquired in step C; and E. mining a mining face adjacent to the one or more designated water storage spaces wherein mine groundwater generated during mining naturally seeps into the one or more designated water storage spaces as stored groundwater, wherein the mining face has a length, and wherein the one or more designated water storage spaces are increased by increasing the length of the mining face.

2. The method according to claim 1, wherein the method further comprises:

F. providing a water pumping hole communicated to the ground surface on each of the one or more water storage spaces, by which the mine groundwater is pumped to the ground surface for use; and water external to the one or more storage spaces is pumped back to the one or more water storage spaces for storage.

3. The method according to claim 1, wherein step B further comprises: prospecting after the one or more goaf spaces are formed and acquiring the basic geological data after the one or more goaf spaces are formed; and in step D, designating the one or more goaf spaces as the one or more designated water storage spaces according to the obtained basic geological data before stratum mining, the basic geological data of the one or more goafs, and of the flow distribution, water quality data and water pressure data for the mine groundwater acquired in step C.

4. The method according to claim 3, wherein the basic geological data of the strata comprise: strata texture, lithology of each stratum, rock mechanical strength, rock permeability, and space range of the goafs.

5. The method according to claim 3, wherein step C further comprises acquiring fluid flow field conditions in step C and designating a flowing direction of the mine groundwater.

6. The method according to claim 3, wherein the method further comprises:

under the premise of safety, first mining on a mining face with a minimum elevation among mining faces in the area to be mined.

7. The method according to claim 3, wherein the one or more water storage spaces further comprise a gangue purifying layer comprising a sand filter, the sand filter characterized by a filling amount of sand and a granularity of sand, wherein the method further comprises:

during coal mining, backfilling the bottom of the one or more water storage spaces with a filling amount of coal gangues, to form the gangue purifying filtering layer, wherein the coal gangues are characterized by granularity;

wherein the filling amount and the granularity of the gangue purifying filtering layer depend on the filling amount and the filling granularity of the sand filter.

8. The method according to claim 7, wherein the method further comprises:

providing a corresponding mining face before the one or more designated water storage spaces is formed as a preset region which retains the coal gangues with a preset thickness, to form the gangue purifying filtering layer on the bottom of the one or more designated water storage spaces;

wherein the one or more designated water storage spaces further comprise a water pumping hole communicated from the bottom of the gangue purifying filtering layer to the ground surface.

9. The method according to claim 8, wherein during coal mining, a region with a minimum gangue strength is selected as the preset region, and a necessarily retained coal gangue layer thickness is determined according to the filling amount of the sand filter of the one or more water storage spaces; and after coal mining, the coal gangues slump naturally to form a gangue layer of granules with different sizes which serves as the gangue purifying filtering layer.

10. The method according to claim 9, wherein the method further comprises:

during coal mining, backfilling gangue granules with a breaking degree of 200-400 mm to the preset region, to form the gangue purifying filtering layer with better filtering performance.

11. The method according to claim 8, wherein one end of the water pumping hole is connected on the ground surface with a control valve by which the mine groundwater is pumped to the ground surface or external water is pumped back to the one or more water storage spaces.

12. The method according to claim 1, wherein a horizontal tunnel is provided between two of the water storage spaces, wherein the horizontal tunnel is intersected by a main tunnel, and wherein the method further comprises:

sealing and reinforcing drift outlets of the horizontal tunnels of the one or more goaf spaces with a concrete waterproof layer.

13. The method according to claim 12, wherein the method further comprises:

providing a water level observing transparent hose and a water relief pipe at the drift outlet of the one or more designated water storage spaces; and opening a water relief valve for draining water from the one or more water storage spaces if when the water level of the one or more water storages spaces is over a warning level.

* * * * *